(12) United States Patent
Pouliot

(10) Patent No.: US 7,805,707 B2
(45) Date of Patent: Sep. 28, 2010

(54) SYSTEM AND METHOD FOR PREPARING RUNTIME CHECKS

(75) Inventor: Sebastien Pouliot, Beauport (CA)

(73) Assignee: Novell, Inc., Provo, UT (US)

( * ) Notice: Subject to any disclaimer, the term of this patent is extended or adjusted under 35 U.S.C. 154(b) by 1103 days.

(21) Appl. No.: 11/490,118

(22) Filed: Jul. 21, 2006

(65) Prior Publication Data

US 2008/0066063 A1    Mar. 13, 2008

(51) Int. Cl.
G06F 9/44    (2006.01)

(52) U.S. Cl. .................... 717/124; 717/127; 717/131

(58) Field of Classification Search ............... 717/124
See application file for complete search history.

(56) References Cited

U.S. PATENT DOCUMENTS

| | | | |
|---|---|---|---|
| 5,452,457 A * | 9/1995 | Alpert et al. ............. 717/153 |
| 6,071,316 A * | 6/2000 | Goossen et al. ........... 717/126 |
| 6,230,312 B1 | 5/2001 | Hunt ........................ 717/4 |
| 6,282,701 B1 * | 8/2001 | Wygodny et al. ......... 717/125 |
| 6,308,275 B1 | 10/2001 | Vaswani et al. .......... 713/201 |
| 6,560,774 B1 | 5/2003 | Gordon et al. ............ 717/146 |
| 6,615,264 B1 | 9/2003 | Stoltz et al. .............. 709/227 |
| 6,802,054 B2 * | 10/2004 | Faraj ........................ 717/128 |
| 6,871,284 B2 | 3/2005 | Cooper et al. ............ 713/200 |
| 6,971,091 B1 * | 11/2005 | Arnold et al. ............ 717/145 |
| 7,069,554 B1 | 6/2006 | Stammers et al. ......... 717/178 |
| 7,171,655 B2 | 1/2007 | Gordon et al. ............ 717/146 |
| 7,487,221 B2 | 2/2009 | Araki ....................... 709/208 |
| 7,512,965 B1 | 3/2009 | Amdur et al. ............. 726/1 |
| 7,552,472 B2 | 6/2009 | Baffes et al. ............. 726/22 |
| 7,587,487 B1 | 9/2009 | Gunturu ................... 709/224 |
| 7,590,684 B2 | 9/2009 | Herrmann ................. 709/203 |
| 7,620,940 B2 * | 11/2009 | Goldsmith et al. ........ 717/127 |
| 2002/0042897 A1 * | 4/2002 | Klein et al. ............... 714/718 |
| 2002/0069200 A1 | 6/2002 | Cooper et al. ............ 707/9 |
| 2002/0198675 A1 * | 12/2002 | Underseth et al. ......... 702/122 |
| 2003/0041267 A1 | 2/2003 | Fee et al. ................. 713/201 |
| 2003/0065942 A1 | 4/2003 | Lineman et al. .......... 713/201 |
| 2003/0110192 A1 | 6/2003 | Valente et al. ............ 707/513 |
| 2003/0115484 A1 | 6/2003 | Moriconi et al. ......... 713/201 |
| 2003/0177355 A1 | 9/2003 | Elgressy et al. .......... 713/167 |
| 2003/0196114 A1 | 10/2003 | Brew et al. ............... 713/201 |
| 2003/0225822 A1 | 12/2003 | Olson et al. .............. 709/202 |
| 2004/0103323 A1 | 5/2004 | Dominic ................... 713/202 |

(Continued)

OTHER PUBLICATIONS

Sundmark et al. "Monitored Software Components—A Novel Software Engineering Approach", Software Engineering Conference, Nov. 30-Dec. 3, 2004, pp. 624-631.*

(Continued)

*Primary Examiner*—Thomas K Pham
(74) *Attorney, Agent, or Firm*—Pillsbury Winthrop Shaw Pittman LLP

(57) ABSTRACT

System and method for allowing embedded devices, even with a limited amount of CPU power and limited memory, to run code more efficiently by eliminating all or most of the runtime checks, while retaining the benefits of runtime checks. The runtime checks may be moved or duplicated to an outside application running on a remote computer. The outside application can prepare the runtime checks for execution at the embedded system. The embedded system may receive pre-validated code and store it inside custom cache for later execution using a check-less, or check-limited, runtime on the embedded device.

20 Claims, 4 Drawing Sheets

U.S. PATENT DOCUMENTS

| | | | | |
|---|---|---|---|---|
| 2004/0250112 | A1 | 12/2004 | Valente et al. | 713/200 |
| 2005/0071668 | A1* | 3/2005 | Yoon et al. | 713/200 |
| 2005/0172126 | A1 | 8/2005 | Lange et al. | 713/166 |
| 2005/0240999 | A1 | 10/2005 | Rubin et al. | 726/22 |
| 2005/0262517 | A1 | 11/2005 | French | 719/316 |
| 2006/0064737 | A1 | 3/2006 | Wallace | 726/1 |
| 2006/0117299 | A1* | 6/2006 | Goldsmith et al. | 717/124 |
| 2006/0143396 | A1 | 6/2006 | Cabot | 711/134 |
| 2006/0150021 | A1* | 7/2006 | Traskov et al. | 714/37 |
| 2006/0235655 | A1* | 10/2006 | Qing et al. | 702/186 |

OTHER PUBLICATIONS

Sokolsky et al. "Steering of Real-Time Systems Based on Monitoring and Checking" Proceedings. Fifth International Workshop on Nov. 18-20, 1999, pp. 11-18.*

Clark, Jason, "Return of the Rich Client—Code Access Security and Distribution Features in .NET Enhance Client-Side Apps", *MSDN Magazine*, printed from http://msdn.microsoft.com/msdnmag/issues/02/06/rich/default.aspx, Jun. 2002, 16 pages.

MONO, "MONO:Runtime—The Mono Runtime", printed from http://www.mono-project.com/Mono:Runtime, Jan. 24, 2006, 8 pages.

Mono, "Assemblies and the GAC—How Mono Finds Assemblies", printed from http://www.mono-project.com/Assemblies_and_the_GAC, Jul. 20, 2005, 11 pages.

Damianou, Nicodemos C., "A Policy Framework for Management of Distributed Systems", Thesis, Imperial College of Science, Technology and Medicine, University of London, Department of Computing, Feb. 2002, 233 pages.

Oaks, Scott, "Java Security, $2^{nd}$ Edition", Publisher O'Reilly Media, Inc., May 17, 2001, 22 pages.

* cited by examiner

SYSTEM AND METHOD FOR PREPARING RUNTIME CHECKS

FIELD OF INVENTION

The present invention is system and method for performing runtime checks within a preparation application located outside embedded devices and more particularly for using a custom assembly cache to receive and store pre-validated assembly code into the embedded device for execution.

BACKGROUND

Embedded devices are able to run specific task related functions to provide some fixed functionalities (e.g., RFID chips). Many high-end devices are able to download and execute external code in order to provide added functionality. Embedded devices may include, but are not limited to, consumer electronics, medical devices, vending machines, point of sale terminals and other devices. Functionalities may include the ability to process financial transactions, perform detailed calculations and human automation, among many other functions. Embedded devices may be allowed to execute code for performing these various functions. However, to ensure the code functions correctly, multiple runtime checks may need to be performed. Runtime checks are a mechanism to check for error conditions at execution time, in contrast to checks done by the programming language and compilers (called compile-time checks) which only check for syntactical and type-related errors. Some of the runtime checks occur at startup, wherein the program is terminated if an error is found during the checks (e.g., a missing dependency, lack of certain hardware, etc.). Other runtime checks occur during the application execution and generally, throw exceptions if a check fails. Many of the runtime checks could be done prior to starting the application execution.

Recent embedded devices have begun to use virtual machines (VM), like the ECMA 335 VM, in order to provide increased platform portability and a richer development environment for devices. The increased portability is possible because VM converts code into machine language and executes it and may create an environment between a computer platform and the end user (e.g., embedded device) in which the end user can operate software applications properly. During runtime the virtual machine and assembly code may be used together to run an application. A more rich development environment is inherited from all the software available on the personal computer to support the VM. While this may solve issues related to using embedded devices, it also introduces new problems as well including as adding VM specific requirements (e.g., multiple runtime checks) that may need to be performed on an embedded device with limited resources.

Performing runtime checking has been known to slow down performance and VM requires even more runtime checks than the traditional approach which uses native code. In performance critical applications, some of the runtime check may be switched off. The downside to this being that the application may not execute properly if a check fails during execution (e.g. crash or wrong results). In addition, to keep cost down, embedded devices often have very limited CPU power and very limited memory, and this may be a source of many problems. For example, smaller devices, such as PDA's and other hand held computing devices, while convenient, usually have less memory, disk space, and resources than a personal computer. During runtime, many checks on code are completed before execution begins, which means a large amount of code is required to implement the runtime check. However, this does not add visible functionality to the application. Additional processing time may also be needed to verify all the code cases. The quantity of checks can differ between different runtimes. Some runtime standards (e.g., ECMA-335 Common Language Infrastructure (CLI)) may be heavier on verification requirements than others (e.g., loading an assembly, verifying the metadata, etc.). This presents code size and time issues both of which may be limited resources on embedded devices. There is a need for providing embedded devices having limited resources with the efficient method for providing runtime checking without the disadvantages of slowing down performance.

SUMMARY

Various aspects of the invention, overcome at least some of these and other drawbacks of known systems. According to one aspect of the invention, an embedded system may implement a check-less, or check-limited, runtime including a custom assembly cache used to store pre-validated code. Non-permanent communication means may be implemented between the embedded device and a computer having a code library and assembly preparation application which allows the checks to be done outside the embedded device itself. At this stage the embedded system may execute the check-less runtime using the assembly information from custom, trusted, assembly cache.

According to another aspect of the invention, an embedded system may communicate via network connection to receive updated and pre-validated code from remote sources on the network (e.g., pull model).

According to another aspect of the invention a preparation application may schedule the transmission of updated and pre-validated updates for multiple embedded devices running on a network (e.g., a push model).

The invention provides a solution for keeping the advantages of running all the code checks for smaller embedded devices without much of their inconveniences. These and other objects, features and advantages of the invention will be apparent through the detailed description of the embodiments and the drawings attached hereto. It is also to be understood that both the foregoing general description and the following detailed description are exemplary and not restrictive of the scope of the invention.

DETAILED DESCRIPTION

Embedded devices may run using code that has been checked for runtime errors without actually running the runtime checking procedures locally on the embedded device or system. An embedded device may include a virtual machine for running applications and may further include runtime libraries for execution of applications. Runtime checks may be moved (or duplicated) outside of the embedded device into a preparation application executed from a computer (or an embedded device) capable of running the code checks. Code checking may check for runtime errors including errors in code syntax and/or logic. For example, recent VM, like ECMA-335, require multiple checks to validate assembly structure and metadata in order to ensure safe execution. Runtime checking before an application executes on a system may prevent runtime errors from occurring during execution on an embedded device.

Figure 1:
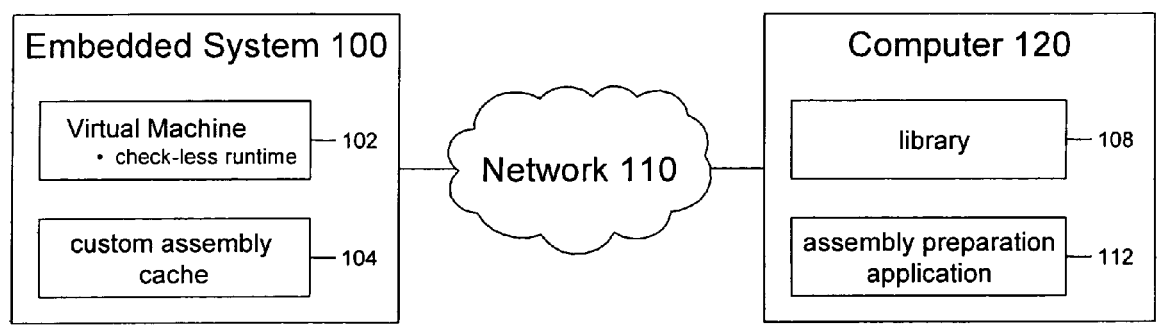
FIG. 1 is a high-level block diagram for a system; according to an embodiment of the invention.

FIG. 1 is a high level diagram of an embedded system (or device) 100 connected to a remote computer 120, according to one aspect of the invention. The embedded system (or device) 100 may have limited memory and/or processing resources. An embedded system 100 may be used at various locations and environments including, but not limited to, consumer kiosk, consumer electronics, point of sale terminals, personal communication devices, and/or vending machine. A virtual machine 102 may be implemented to run applications on the embedded system 100. The embedded system can include a permanent or a temporary communication means over a network 110 to remote computer 120. Although, referred to as "remote" the computer 120 may also be implemented locally with respect to the embedded device or at a physically separate machine. The remote computer 120 may be any host computer, personal computer, or another embedded device, with memory and processing resources capable of greater execution power than the embedded device 100.

While the implementations of an embedded device may vary, the need for highly functional code remains. Thus, the virtual machine 102 may be implemented, at least in part, to run diverse application code on an embedded device 100. Applications may require a multiple number of files and/or assemblies in order to execute properly. An embedded device may run assemblies, although, according to the invention, assembly runtime checks may be moved (or duplicated) to outside of the device 100 into a library 108 on the remote computer 120. Assembly information may be moved (or duplicated) and stored at the remote computer 120 within the code library 108. The library 108 can be used independently of the embedded device's runtime. An outside application may be used to prepare the assemblies for the check-less runtime on the embedded device 100. An outside application may be referred to as an assembly preparation application 112 and can run the checks that may be necessary or desired for the application to execute without runtime errors on the embedded device 100. The assembly preparation application 112 may be run one (or more) times (e.g., on a PC) before the assembly is loaded back (or sent) to the embedded device 100.

After the preparation application 112 executes, the checked assemblies may be loaded into a custom assembly cache 104, which may be a separate assembly cache from other assembly caches that may already exist on the embedded device. The custom assembly cache 104 may be implemented in the embedded system in flash memory (or other temporary memory) to receive assemblies from the assembly preparation application 112 on the remote computer 120 or other source. A "check-less" embedded runtime may then be executed on the embedded device using assemblies from the custom assembly cache 104. This enables the embedded device 100 to retain all the advantages of the checks without the code size and time penalties. Embedded devices without a custom assembly cache 104 can also exist and depend on the network availability of the computer 120 to download the pre-validated code directly during runtime execution.

Figure 2:
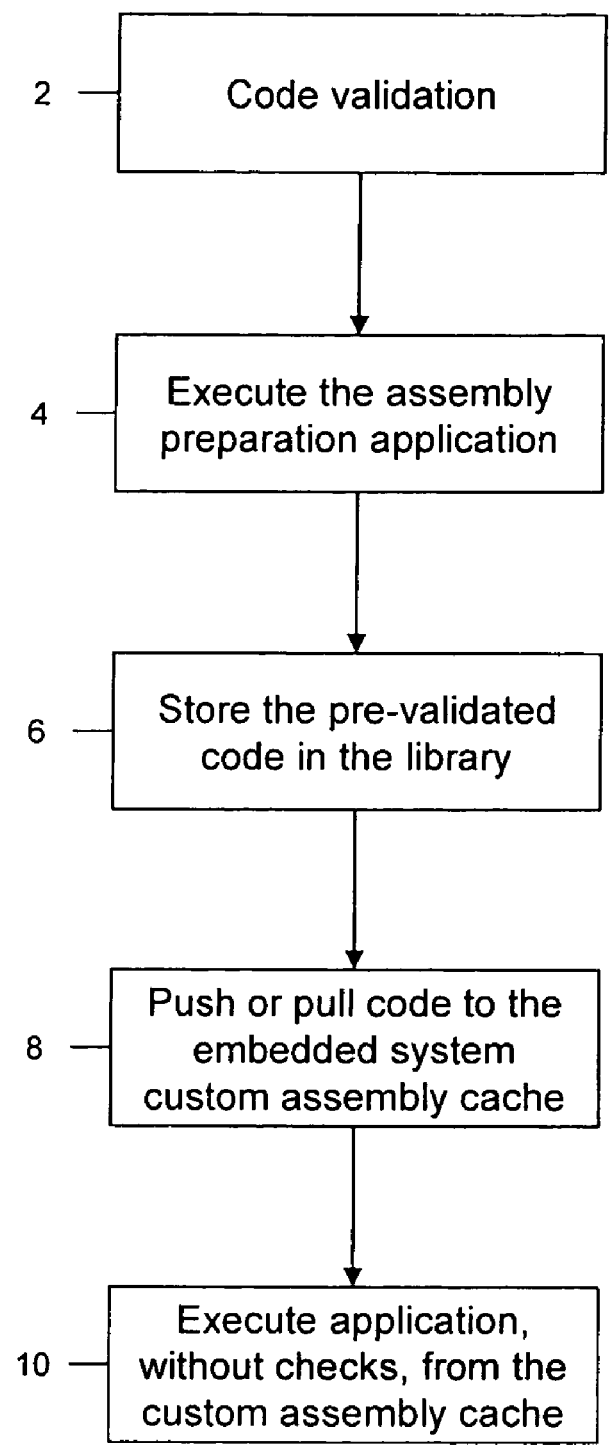
FIG. 2 is a flow chart for a "generic model" method, according to an embodiment of the invention.

FIG. 2 is a flow diagram for a method according to one aspect of the invention. The method disclosed in FIG. 2 is a "generic" model implementation for preparing runtime checks. Before an application can be executed on a "check-less" or "check-limited" runtime, code validation operation may be required (operation 2). At such time the computer 120 may execute the assembly preparation application 112 to pre-validate, and potentially modify, the code (operation 4). Some runtime checks may include, but are not limited to, LinkDemand (JIT time) and the InheritanceDemand (load-time). Other stack-oriented actions including program Demands and program Asserts, could also be performed by the assembly preparations application 112 if the embedded device 100 operates with a fixed security policy. In which case, the preparation application could resolve policy issues and remove actions that are not allowed by the code so that when the code runs on the embedded device, security exceptions based on policy violation may be avoided. Once the code is pre-validated it may be stored at library 108 (operation 6) and subsequently "pushed to" (see FIG. 3) and/or "pulled from" (see FIG. 4) the embedded system 100 (operation 8).

After the assembly has been checked or "prepared" for use on the embedded device, the assembly information may be loaded onto the device at the custom assembly cache which may be ready to accept assemblies coming from the preparation application (operation 8). The embedded device may execute (operation 10) a check-less, or check-limited, runtime with the benefits of checked assembly code by using the assemblies received and stored at custom assembly cache 104.

Figure 3:
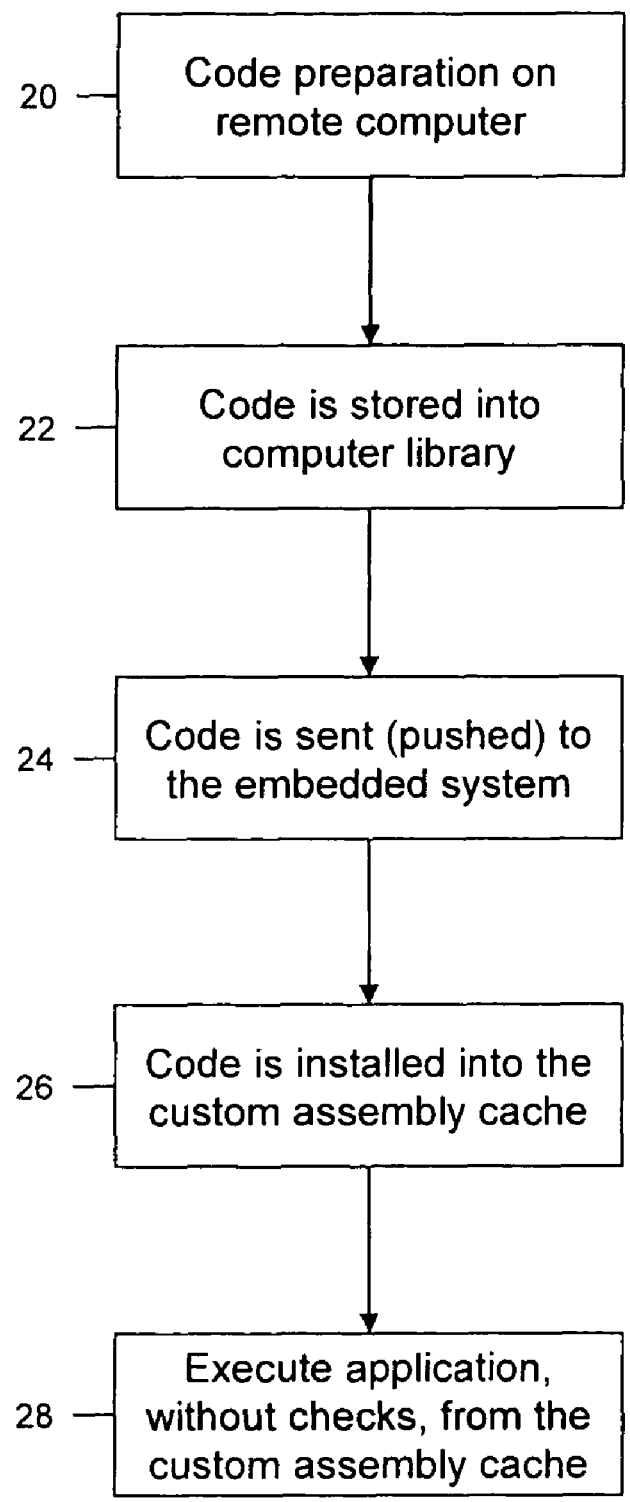
FIG. 3 is a flow chart for a "push model" method, according to an embodiment of the invention.

FIG. 3 is flow diagram for the "push" model. According to another aspect of the invention, a system of the present invention may be used for performing remote updates and installation of assembly code initiated by a remote source, for example the computer 120. A network connection 110 (e.g., internet, LAN, WAN, etc.) may allow remote updates and installation on the embedded system 100 by a remote source. Assemblies may be prepared (operation 20), manually or automatically, by an application located on a networked resource and, optionally, stored into the library 108 (operation 22). The preparations involve performing runtime checks on the code, and possibly modifying the code, before transmitting (operation 24) and installing it (operation 26) to a network embedded device 100. Updates may also be scheduled for distribution to multiple embedded devices 100 running on the network. Finally the embedded system 100 may execute (operation 28) from the custom assembly cache.

Figure 4:
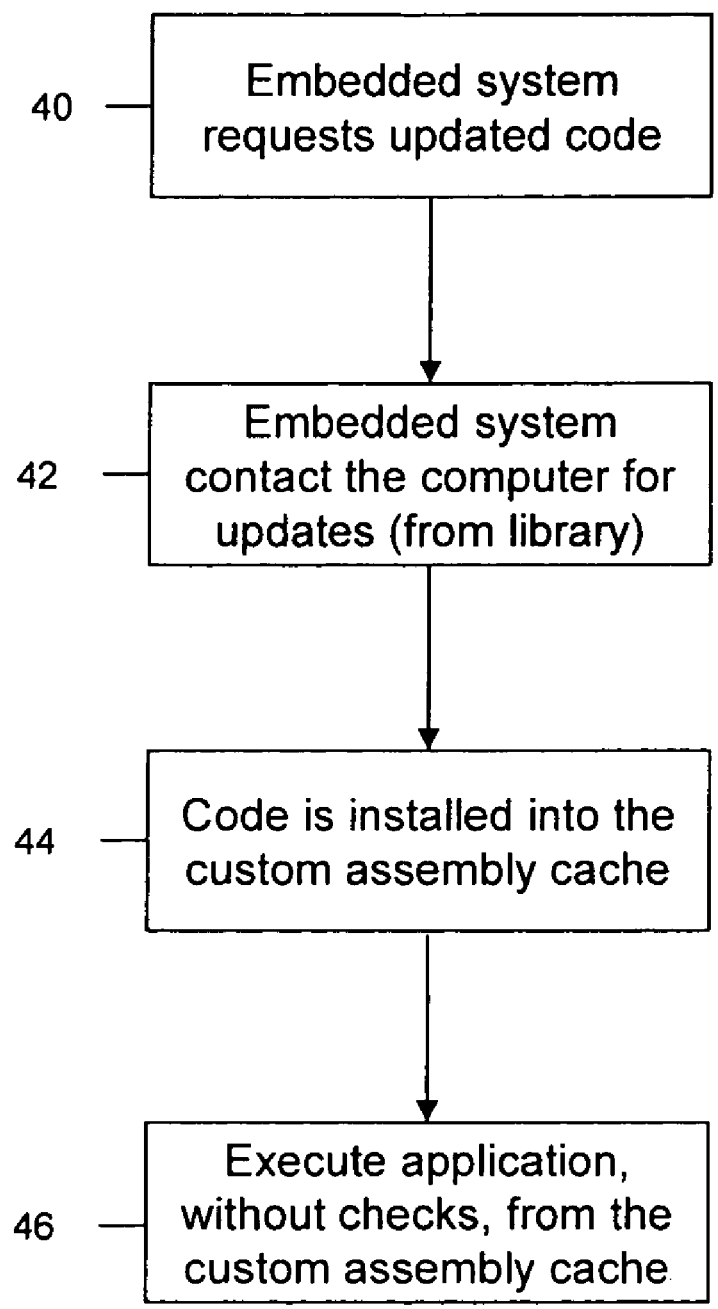
FIG. 4 is a flow chart for a "pull model" method, according to an embodiment of the invention.

FIG. 4 is flow diagram for the "pull" model. According to another aspect of the invention, a system of the present invention may be used to allow independent updates and installation of the code. In this case, the embedded system 100 decides (operation 40), for example at startup, to retrieve updated pre-validated, code by communicating with (operation 22) a known computer 120 to get the updates. If updated code is available it may be installed (operation 44) into the custom assembly cache and executed on the embedded device (operation 46) when needed. The pull model may be useful, for example, when the embedded devices are not always active (e.g. a car micro-controller) or part of the network 110 (e.g. cell phones).

Although the current invention is described with respect to embedded devices, any "thin client" or computer offering secure storage may be used. In the foregoing specification, the invention has been described with reference to specific embodiments thereof. Various modifications and changes may be made thereto without departing from the broader spirit and scope of the invention. The specification and drawings are, accordingly, to be regarded in an illustrative rather than a restrictive sense.

I claim:

1. A computer implemented method for preparing runtime checks for an embedded device, comprising:

executing an assembly preparation application on a computer remotely connected to an embedded device over a network, wherein the executed assembly preparation application performs one or more runtime checks to validate application code that includes one or more assemblies;

storing the application code in a library at the computer in response to the one or more runtime checks validating the application code for execution on the embedded device without runtime errors; and transmitting the one or more assemblies from the computer to the remotely connected embedded device in response to the one or more runtime checks validating the application code for execution on the embedded device, wherein the embedded device executes one or more assemblies transmitted from the remotely connected computer in a check-less runtime.

2. The method of claim 1, wherein the computer transmits the one or more assemblies to the embedded device in response to receiving a request for the validated application code from the embedded device.

3. The method of claim 1, wherein the computer automatically transmits the one or more assemblies to the embedded device based on a distribution schedule.

4. The method of claim 3, further comprising transmitting the one or more assemblies from the computer to one or more additional remotely connected embedded devices based on the distribution schedule.

5. The method of claim 1, wherein the embedded device executes the one or more assemblies in a virtual machine that includes the check-less runtime.

6. The method of claim 1, further comprising modifying the application code with the assembly preparation application in response to the one or more runtime checks determining that executing the application code on the embedded device will cause one or more runtime errors, wherein the application code stored in the library comprises the modified application code.

7. The method of claim 6, wherein the modified application code resolves the one or more runtime errors, whereby the assembly preparation application validates the modified application code for execution on the embedded device without the one or more runtime errors.

8. The method of claim 7, wherein the assembly preparation application modifies the application code to avoid one or more policy violations or remove one or more actions that the application code prohibits to resolve the one or more runtime errors.

9. The method of claim 1, wherein the one or more runtime checks validate one or more just-in-time link demands, one or more one or more inheritance demands, one or more program demands, or one or more assert demands in the application code.

10. A computer system for preparing runtime checks for an embedded device, wherein the system comprises a computer remotely connected to an embedded device over a network, the computer configured to:

execute an assembly preparation application that performs one or more runtime checks to validate application code that includes one or more assemblies;

store the application code in a library at the computer in response to the one or more runtime checks validating the application code for execution on the embedded device without runtime errors; and transmit the one or more assemblies to the remotely connected embedded device in response to the one or more runtime checks validating the application code for execution on the embedded device, wherein the embedded device executes the one or more assemblies transmitted from the remotely connected computer in a check-less runtime.

11. The system of claim 10, wherein the computer transmits the one or more assemblies to the embedded device in response to receiving a request for the validated application code from the embedded device.

12. The system of claim 10, wherein the computer automatically transmits the one or more assemblies to the embedded device based on a distribution schedule.

13. The system of claim 12, the computer further configured to transmit the one or more assemblies to one or more additional remotely connected embedded devices based on the distribution schedule.

14. The system of claim 10, wherein the embedded device executes the one or more assemblies in a virtual machine that includes the check-less runtime.

15. The system of claim 10, the computer further configured to modify the application code with the assembly preparation application in response to the one or more runtime checks determining that executing the application code on the embedded device will cause one or more runtime errors, wherein the application code stored in the library comprises the modified application code.

16. The system of claim 15, wherein the modified application code resolves the one or more runtime errors, whereby the assembly preparation application validates the modified application code for execution on the embedded device without the one or more runtime errors.

17. The system of claim 16, wherein the assembly preparation application modifies the application code to avoid one or more policy violations or remove one or more actions that the application code prohibits to resolve the one or more runtime errors.

18. The system of claim 10, wherein the one or more runtime checks validate one or more just-in-time link demands, one or more one or more inheritance demands, one or more program demands, or one or more assert demands in the application code.

19. A computer implemented method for preparing runtime checks for an embedded device, comprising:

communicating a request to validate application code that includes one or more assemblies from an embedded device to a computer remotely connected to the embedded device over a network, wherein the remotely connected computer executes an assembly preparation application that performs one or more runtime checks to validate the application code in response to receiving the request from the embedded device;

receiving the one or more assemblies from the remotely connected computer at the embedded device in response to the one or more runtime checks validating the application code for execution on the embedded device without runtime errors; and executing the one or more assemblies received from the remotely connected computer on the embedded device in a virtual machine that includes a check-less runtime.

20. A computer system for preparing runtime checks for an embedded device, wherein the system comprises an embedded device remotely connected to a computer over a network, the embedded device configured to:

communicate a request to validate application code that includes one or more assemblies to the remotely connected computer, wherein the remotely connected computer executes an assembly preparation application that performs one or more runtime checks to validate the application code in response to receiving the request from the embedded device;

receive the one or more assemblies from the remotely connected computer at the embedded device in response to the one or more runtime checks validating the application code for execution on the embedded device without runtime errors; and execute the one or more assemblies received from the remotely connected computer on the embedded device in a virtual machine that includes a check-less runtime.

* * * * *